United States Patent
Oh et al.

(10) Patent No.: US 7,626,923 B2
(45) Date of Patent: Dec. 1, 2009

(54) METHOD AND APPARATUS OF THE VARIABLE POINTS IFFT/FFT

(75) Inventors: Hyun-Seo Oh, Daejon (KR); Hyoung-Goo Jeon, Busan (KR); Hyun Lee, Seoul (KR); Won-Chul Choi, Cheongju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 269 days.

(21) Appl. No.: 11/681,201

(22) Filed: Mar. 2, 2007

(65) Prior Publication Data

US 2007/0201354 A1   Aug. 30, 2007

(30) Foreign Application Priority Data

Sep. 3, 2004   (KR) ............... 10-2004-0070238
Dec. 15, 2004   (WO) ............... PCT/KR2004/003304

(51) Int. Cl.
*H04J 11/00* (2006.01)
(52) U.S. Cl. ................... 370/210; 370/208
(58) Field of Classification Search ........ 370/203, 370/208, 210
See application file for complete search history.

(56) References Cited

U.S. PATENT DOCUMENTS

| 7,010,027 | B1 * | 3/2006 | Mestdagh et al. ......... 375/222 |
| 7,042,969 | B2 * | 5/2006 | Lai ......................... 375/348 |
| 7,200,196 | B2 * | 4/2007 | Li et al. .................. 375/355 |
| 7,333,422 | B2 * | 2/2008 | Amer ...................... 370/210 |
| 2003/0145026 | A1 * | 7/2003 | Jin ........................ 708/404 |
| 2004/0071079 | A1 * | 4/2004 | Han ....................... 370/210 |
| 2004/0133615 | A1 * | 7/2004 | Hsieh et al. ............. 708/404 |

FOREIGN PATENT DOCUMENTS

| EP | 1237342 A2 * | 9/2002 |
| KR | P1019980070691 | 10/1998 |
| KR | 100284181 B1 | 12/2000 |
| KR | 1020040050540 A | 6/2004 |

OTHER PUBLICATIONS

Jen-Chih Kuo, Ching-Hua Wen, Chih-Hsiu Lin, and An-Yeu (Andy) Wu. VLSI Design of a Variable-Length FFT/IFFT Processor for OFDM-Based Communication Systems, Jan. 2003, EURASIP Journal on Applied Signal Processing 2003-13, pp. 1306-1316.*
Choi, "VLSI Design of a 2048 Point FFT/IFFT by Sequential Data Processing for Digital Audio Broadcasting System," pp. 479-487 (2002), with English abstract.
Kwon et al., "Design of FFT/IFFT processor that is applied to OFDM wireless LAN system," pp. 5-8, with English abstract.

* cited by examiner

*Primary Examiner*—Ricky Ngo
*Assistant Examiner*—Rasheed Gidado

(57) ABSTRACT

Provided are a method and apparatus for performing a variable point Inverse Fast Fourier Transform (IFFT)/Fast Fourier Transform (FFT). The apparatus for performing a variable point IFFT includes: an IFFT interpolator generating interpolation data signals having a determined point and interpolating a plurality of interpolation data, the number of which depends on an IFFT operation mode signal into input data; an IFFT operator generating IFFT operation data signals by performing an IFFT operation for the interpolated data signals; an IFFT mode selector selecting and outputting some of the IFFT operation data signals in response to the IFFT operation mode signal so that the selected IFFT operation data have the same number of points as the input data; and a control unit outputting the IFFT operation. Therefore, it is possible to easily compute variably sized IFFT/FFT hardware.

15 Claims, 9 Drawing Sheets

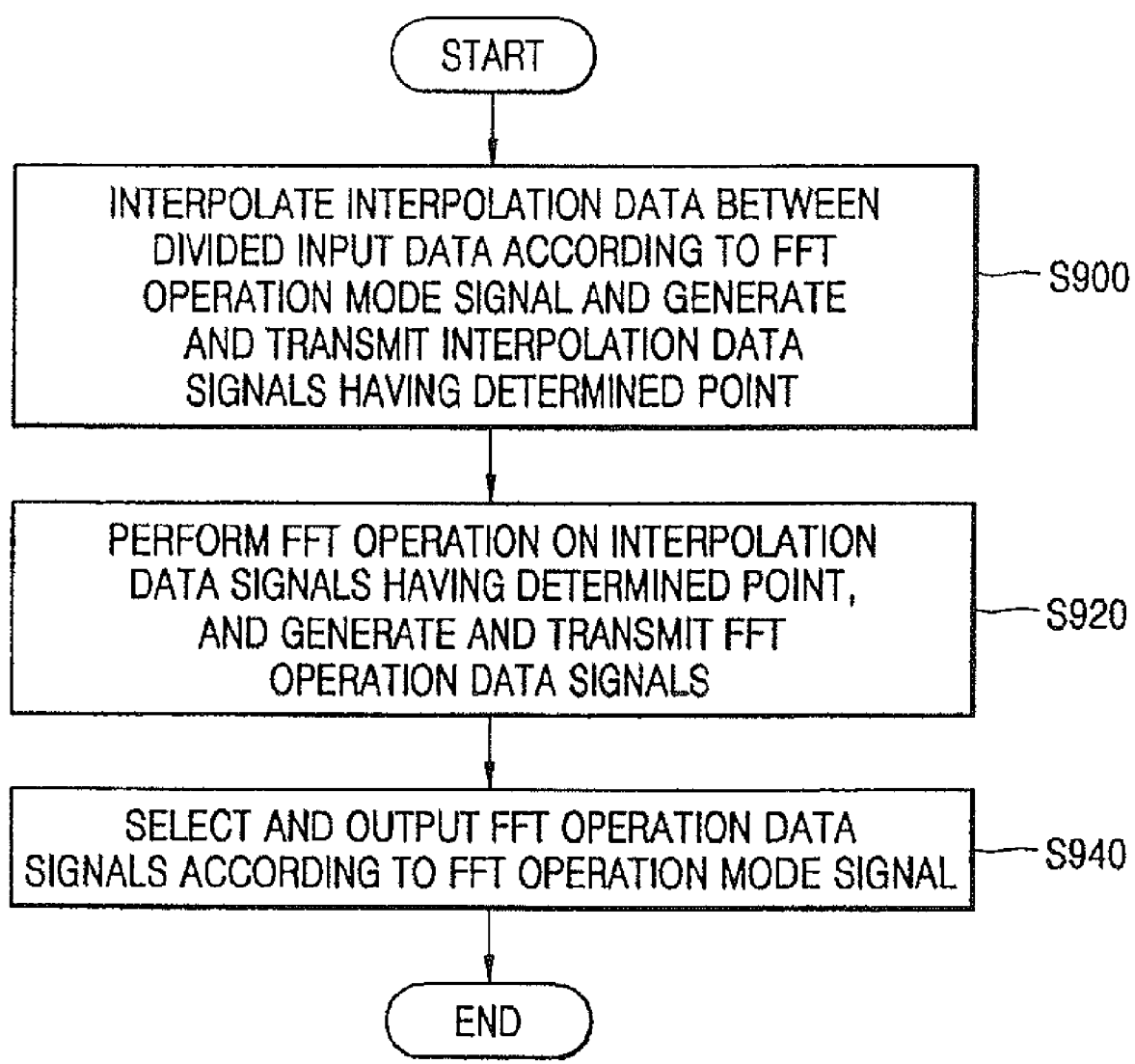

METHOD AND APPARATUS OF THE VARIABLE POINTS IFFT/FFT

CROSS-REFERENCE TO RELATED APPLICATIONS

This is a U.S. National Application under 35 U.S.C. §111 (a) of International Application No. PCT/KR2004/003304, filed on Dec. 15, 2004, which claims the benefit of Korean Application No. 10-2004-0070238, filed Sep. 3, 2004, the complete disclosure of which is incorporated herein by reference.

TECHNICAL FIELD

The present invention relates to a method and apparatus for performing a variable point IFFT/FFT.

BACKGROUND ART

A wireless mobile communication requires fast mobility and fast data transmission. To this end, an orthogonal frequency division multiplex (OFOM) modem is used in a physical layer. An Inverse Fast Fourier Transform (IFFT)/Fast Fourier Transform (FFT) apparatus is indispensable for the OFDM modem to transmit and receive data.

The IEEE 802 (11a, 16e, etc.) standard adopts the OFDM as a modulation standard and suggests various sizes of the IFFT. Fast wireless communication uses an IEEE 802 (11a, 16e, etc.) modem and requires the modem to be variable regardless of the type of connection of the physical layer. A single modem should perform variable point IFFT/FFT in which various sizes of IFFT/FFTs are performed in order to perform a variety of modulation and demodulation functions in the IEEE 802 (11a, 16e, etc.) standard.

BRIEF DESCRIPTION OF THE DRAWINGS

The above and other features and advantages of the present invention will become more apparent by describing in detail exemplary embodiments thereof with reference to the attached drawings in which:

FIG. 9 is a flowchart illustrating a method of performing a variable point FFT according to an embodiment of the present invention.

DETAILED DESCRIPTION OF THE INVENTION

Technical Goal of the Invention

Figure 1:
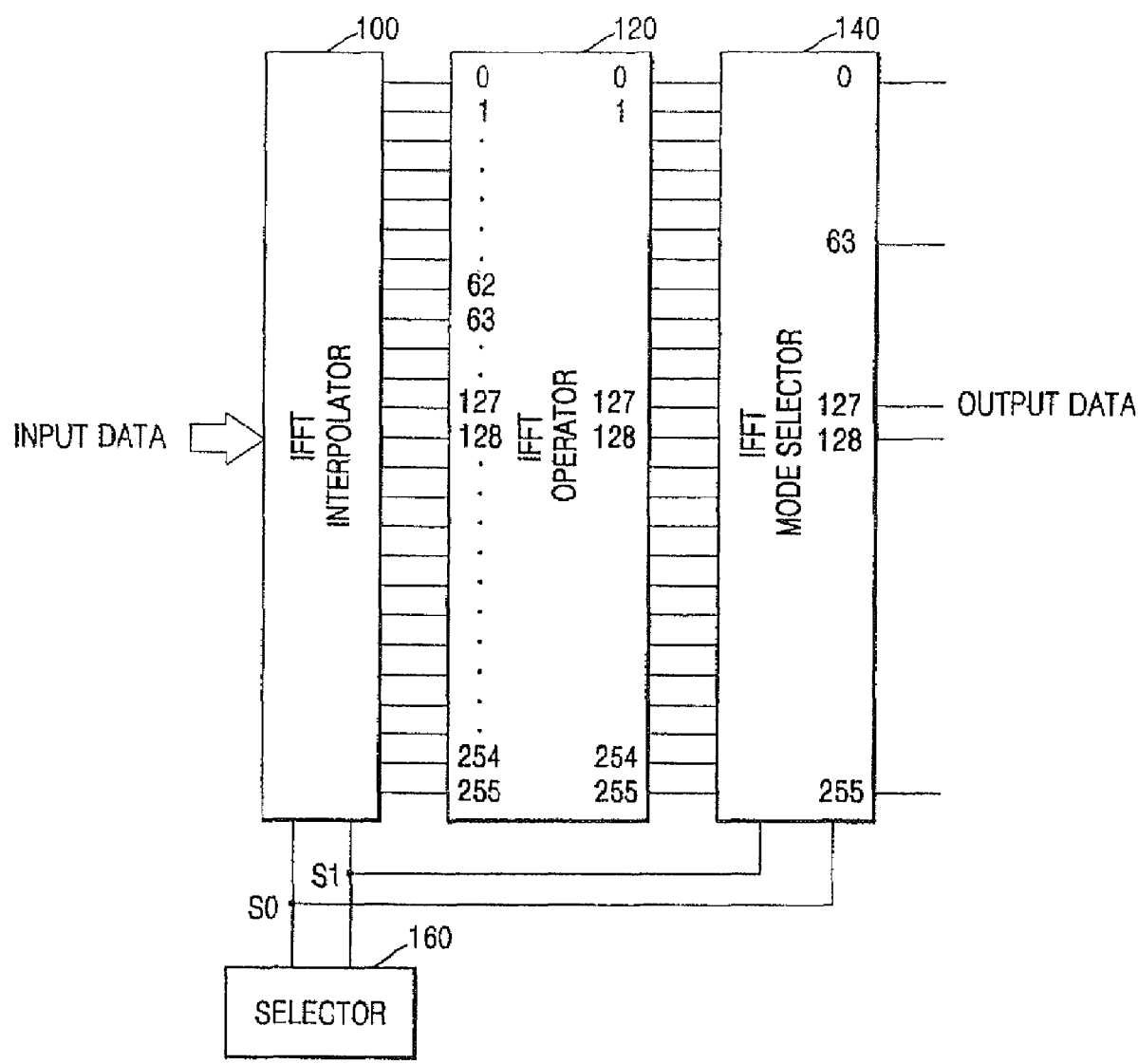
FIG. 1 is a block diagram of a variable point inverse fast Fourier transform (IFFT) apparatus capable of performing variable point IFFT according to an embodiment of the present invention.

Conventionally, a fast DSP processor is used by a modem to execute software and performs a variable modem. However, it is difficult to realize software-like processing using a DSP chip in real time since a larger IFFT/FFT results in longer memory access time.

Disclosure of the Invention

According to an aspect of the present invention, there is provided a method and apparatus for performing a variable point IFFT/FFT that simplifies the computation of an IFFT/FFT with a variable size using apparatus since a variable modem uses an IFFT/FFT with various sizes, e.g., 64 points, 1024 points, or 2048 points.

Effect of the Invention

According to the present invention, a method and apparatus for realizing apparatus used to support variable point IFFT/FFT make it possible to reconfigure a modem and easily unite WiBro/WLAN(IEEE802.11a) in a single modem.

According to the present invention, a method and apparatus for realizing apparatus used to support variable point IFFT/FFT make it possible to easily compute various IFFTs/FFTs with variable size using apparatus since a variable modem uses an IFFT/FFT with various sizes, e.g., 64 points, 1024 points, or 2048 points.

BEST MODE FOR CARRYING OUT THE INVENTION

According to an aspect of the present invention, there is provided an apparatus for performing a variable point Inverse Fast Fourier Transform (IFFT), comprising: an IFFT interpolator generating interpolation data signals having a determined point and interpolating a plurality of interpolation data, the number of which depends on an IFFT operation mode signal into input data; an IFFT operator generating IFFT operation data signals by performing an IFFT operation for the interpolated data signals; an IFFT mode selector selecting and outputting some of the IFFT operation data signals in response to the IFFT operation mode signal so that the selected IFFT operation data have the same number of points as the input data; and a control unit outputting the IFFT operation mode signal to the IFFT interpolator and the IFFT mode selector.

According to another aspect of the present invention, there is provided an apparatus for performing a variable point Fast Fourier Transform (FFT), comprising: an FFT interpolator generating interpolation data signals having a determined point and interpolating interpolation data, the number of which depends on an FFT operation mode signal into input data; an FFT operator generating FFT operation data signals by performing an FFT operation for the interpolated data signals; an FFT mode selector selecting and outputting some of the FFT operation data signals in response to the FFT operation mode signal so that the selected FFT operation data have the same number of points as the input data; and a control unit outputting the FFT operation mode signal to the FFT interpolator and the FFT mode selector.

According to still another aspect of the present invention, there is provided a method of performing a variable point IFFT, comprising: dividing input data into two sections, and generating interpolation data signals having a determined point in IFFT apparatus by interpolating a plurality of interpolation data, the number of which depends on an IFFT operation mode signal, between the sections on the input data; generating IFFT operation data signals by performing an IFFT operation for the interpolated data signals; and selecting and outputting some of the IFFT operation data signals in response to the IFFT operation mode signal so that the selected IFFT operation data have the same number of points as the input data.

According to yet another aspect of the present invention, there is provided a method of performing a variable point FFT, comprising: generating interpolation data signals having a determined point in FFT apparatus by interpolating a plurality of interpolation data, the number of which depends on the FFT operation mode signal between points of the input data; generating IFFT operation data signals by performing an FFT operation for the interpolated data signals; and selecting and outputting some of the FFT operation data signals in response to the FFT operation mode signal so that the selected FFT operation data have the same number of points as the input data.

EMBODIMENTS

The present invention will now be described more fully with reference to the accompanying drawings.

Figure 2:
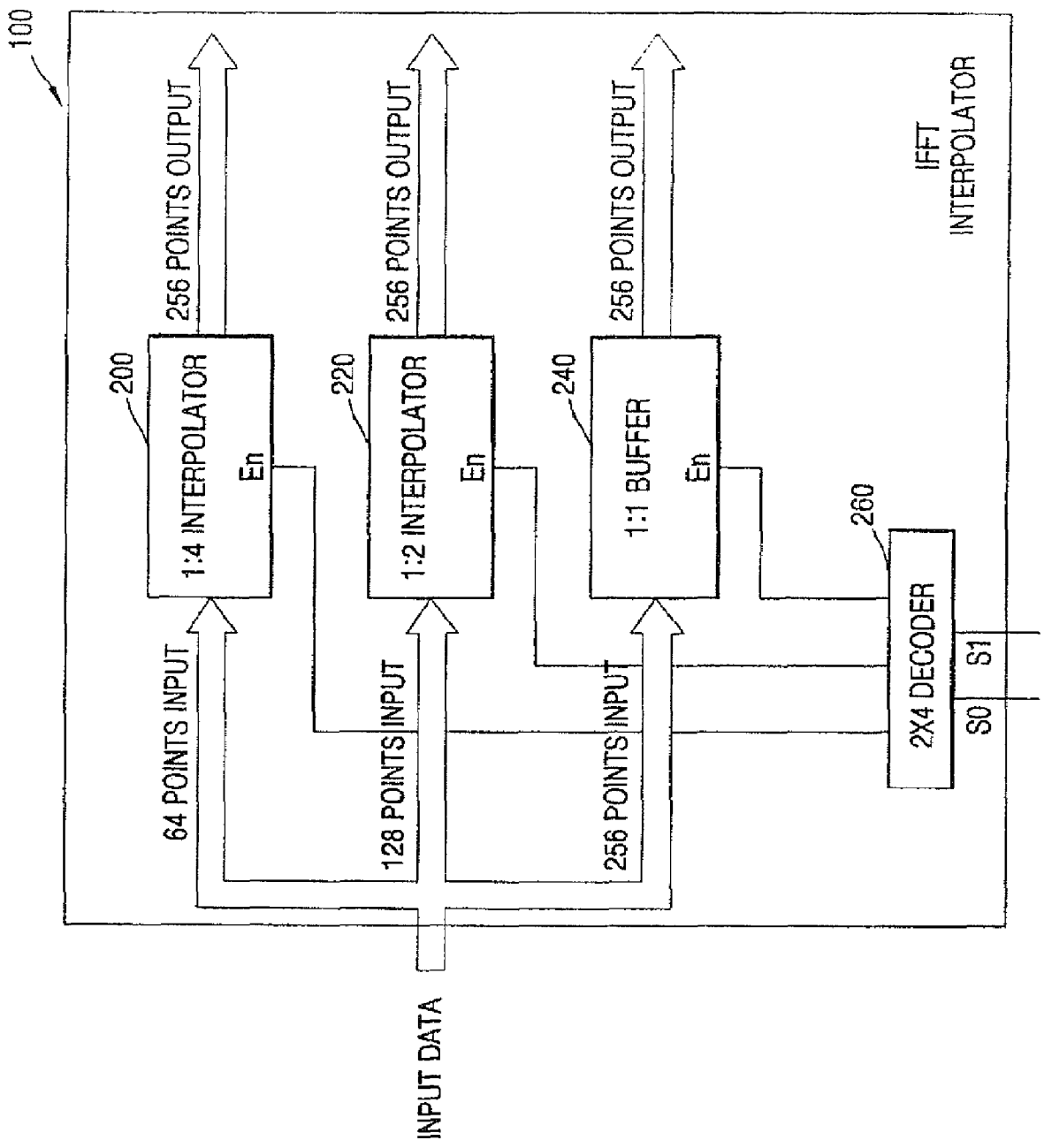
FIG. 2 is a block diagram of an IFFT interpolator illustrated in FIG. 1.
Figure 3:
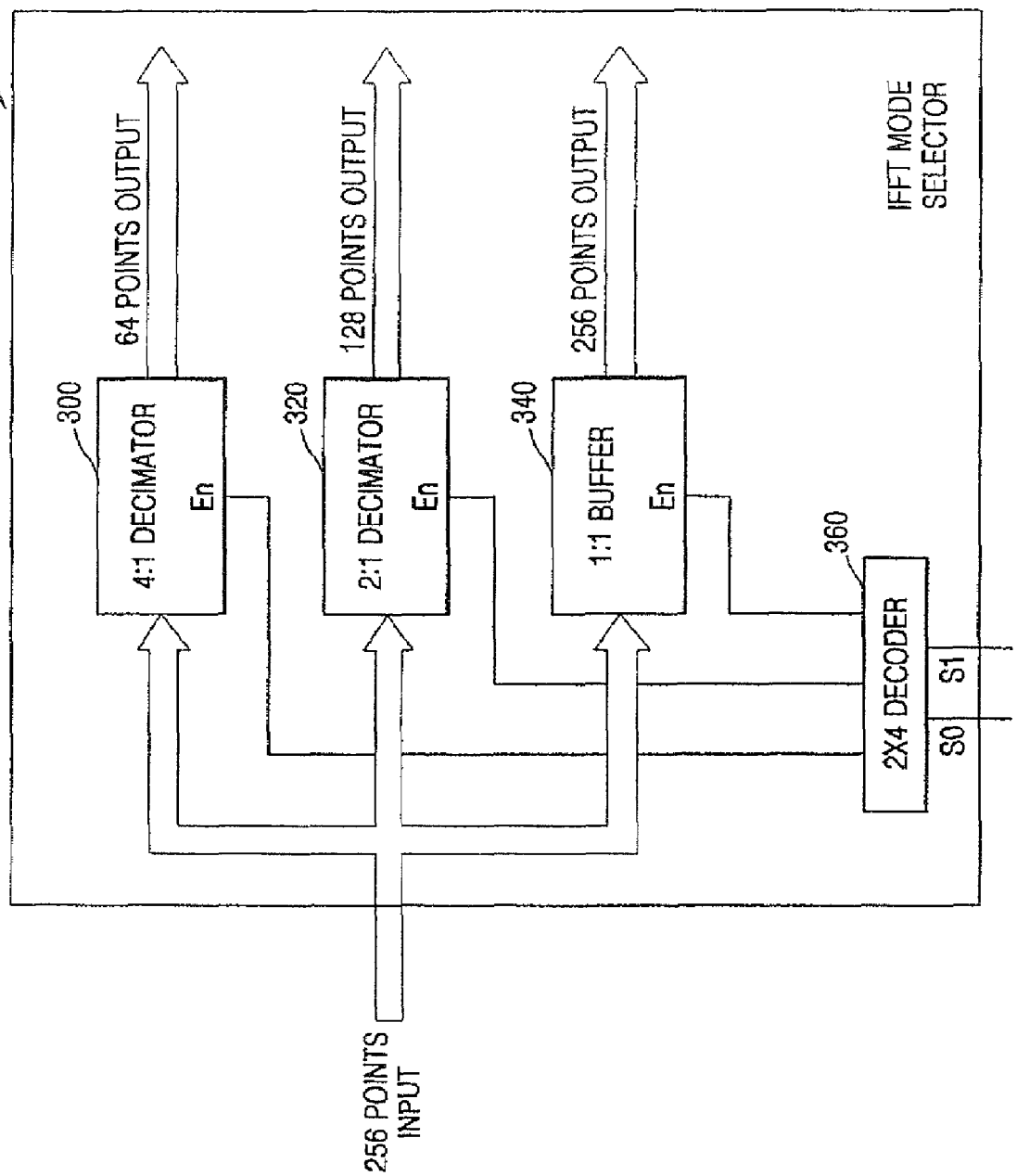
FIG. 3 is a block diagram of an IFFT mode selector illustrated in FIG. 1.

FIG. 1 is a block diagram of a variable point inverse fast Fourier transform (IFFT) apparatus capable of performing variable point IFFT according to an embodiment of the present invention. FIG. 2 is a block diagram of an IFFT interpolator 100 illustrated in FIG. 1. FIG. 3 is a block diagram of an IFFT mode selector 140 illustrated in FIG. 1.

Referring to FIG. 1, the variable point IFFT apparatus comprises the IFFT interpolator 100, an IFFT operator 120, and the IFFT mode selector 140. The variable point IFFT apparatus performs the 64 points IFFT, 128 points IFFT, and 256 points IFFT.

The IFFT interpolator 100 and the IFFT mode selector 140 receive operation mode control signals S1 and S0 and select an IFFT operation mode.

The relationship between the operation modes of the variable point IFFT apparatus and the operation mode control signals S1 and S0 is illustrated in Table 1 below.

TABLE 1

| operation mode control signals (S1 and S0) | IFFT/FFT operation mode |
| --- | --- |
| 0 0 | 64 points |
| 0 1 | 128 points |
| 1 0 | 256 points |
| 1 1 | reserved |

The IFFT interpolator 100 interpolates interpolation data (preferably, 0) into the data input to the variable point IFFT apparatus according to the IFFT operation mode. The IFFT interpolator 100 will now be described in detail with reference to FIG. 2.

Referring to FIG. 2, a 2×4 decoder 260 receives the operation mode control signals S1 and S0 and generates an operation active signal based on the information shown in Table 1. When the operation mode control signals S1 and S0 are 00, i.e., when the IFFT operation mode is a 64 points mode, the 2×4 decoder 260 outputs an operation active signal to a 1:4 interpolator 200.

When the operation mode control signals S1 and S0 are 01, i.e., when the IFFT operation mode is a 128 points mode, the 2×4 decoder 260 outputs an operation active signal to a 1:2 interpolator 220.

When the operation mode control signals S1 and S0 are 10, i.e., when the IFFT operation mode is a 256 points mode, the 2×4 decoder 260 outputs an operation active signal to a 1:1 buffer 240.

When the operation mode control signals S1 and S0 are 11, the IFFT operation mode is in a reserved mode.

The operation of the IFFT interpolator 100 when the operation mode control signals S1 and S0 are 00, i.e., when the IFFT operation mode is the 64 points mode, which means that the input data contains 64 points, will now be described in detail. At the same time, the 2×4 decoder 260 outputs the operation active signal to the 1:4 interpolator 200.

Upon receiving input data containing 64 points, the 1:4 interpolator 200 generates a 256-bit stream in which the $0^{th}$ through $31^{st}$ points are the $0^{th}$ through $31^{st}$ points received by the 1:4 interpolator 200, the $224^{th}$ through $255^{th}$ points are the $32^{nd}$ through $63^{rd}$ points received by the 1:4 interpolator 200, and the $32^{nd}$ through $223^{rd}$ points are zeros. That is, in order to output data containing 256 points from the IFFT interpolator 100, the 1:4 interpolator 200 inserts 192 zeros between the first 32 received points and the remaining 32 received points.

The operation when operation mode control signals S1 and S0 are 01, i.e., when the IFFT operation mode is the 128 points mode, which means that the input data contains 128 points, will now be described. At the same time, the 2×4 decoder 260 outputs the operation active signal to the 1:2 interpolator 220.

Upon receiving input data containing 128 points, the 1:2 interpolator 220 generates a 256-bit stream in which the $0^{th}$ through $63^{rd}$ points are the $0^{th}$ through $63^{rd}$ points received by the 1:2 interpolator 220, the $192^{nd}$ through $255^{th}$ points are the $64^{th}$ through $127^{th}$ points received by the 1:2 interpolator 220, and the $64^{th}$ through $191^{st}$ points are zeros. That is, in order to output data containing 256 points from the IFFT interpolator 100, the 1:2 interpolator 220 inserts 128 zeros between the first 64 received points and the remaining 64 received points.

The operation when the operation mode control signals S1 and S0 are 10, i.e., when the IFFT operation mode is the 256 points mode, which means that the input data contains 256 points. At the same time, the 2×4 decoder 260 outputs the operation active signal to the 1:1 buffer 240.

Upon receiving input data containing 256 points, the 1:1 interpolator 240 generates a 256-bit stream consisting of the $0^{th}$ through $255^{th}$ points received by the 1:1 interpolator 240.

The IFFT operator 120 receives output data from the IFFT interpolator 100 to perform the IFFT.

When the IFFT operation mode is the 64 points mode, the IFFT interpolator 100 performs four times oversampling due to the 0s interpolated into the data input to the variable point IFFT apparatus. After the IFFT interpolator 100 interpolates the 0s into the $32^{nd}$ through $223^{rd}$ points of the 256-bitstream, the IFFT operator 120 performs IFFT operation on the 256 points and outputs IFFT data containing 256 points. However, since the input data contains 64 points, the IFFT data contains 64 points of independent data. The 64 independent output points include discrete points such as the $0^{th}$ point, $4^{th}$ point, $8^{th}$ point, $12^{th}$ point, $16^{th}$ point of the output 256-bitstream. According to digital signal processing theory, the remaining 192 points, that is, the $1^{st}$ through $3^{rd}$ points, the $5^{th}$ through $7^{th}$ points, the $0^{th}$ through $11^{th}$ points, etc. of the output 256-bitstream are dependent on the 64 points of independent output data. The 192 dependent data are interpolated from the $0^{th}$ point, $4^{th}$ point, $8^{th}$ point, $12^{th}$ point, $16^{th}$ point of the output 256-bitstream, thus resulting in four times oversampling.

In a similar way, when the IFFT operation mode is the 128 points mode, the IFFT interpolator 100 performs two times oversampling due to the 0s interpolated into the data input to the variable point IFFT apparatus.

The IFFT mode selector 140 must select predetermined data from the IFFT operation data in order to properly perform the computation of the oversampled IFFT operation data performed by the IFFT operator 120. To this end, the IFFT operation data obtained by the IFFT operator 120 are input in the IFFT mode selector 140, which will now be described in detail with reference to FIG. 3.

Referring to FIG. 3, the IFFT mode selector 140 receives 256 points of the IFFT operation data from the IFFT operator 120.

A 2×4 decoder 360 receives operation mode control signals S1 and S0 and generates an operation active signal based on the information as shown in Table 1. When the operation mode control signals S1 and S0 are 00, i.e., when the IFFT operation mode is the 64 point mode, the 2×4 decoder 360 outputs an operation active signal to a 4:1 decimator 300.

When the operation mode control signals S1 and S0 are 01, i.e., when the IFFT operation mode is the 128 point mode, the 2×4 decoder 360 outputs an operation active signal to a 2:1 decimator 320.

When operation mode control signals S1 and S0 are 10, i.e., when the IFFT operation mode is a 256 point mode, the 2×4 decoder 360 outputs an operation active signal to a 1:1 buffer 340.

When operation mode control signals S1 and S0 are 11, the IFFT operation mode is a reserved mode.

The operation of the IFFT mode selector 140 when the operation mode control signals S1 and S0 are 00, i.e., when the IFFT operation mode is the 64 point mode, which means that the input data contains 64 points will now be described in detail. At this time, the 2×4 decoder 360 outputs the operation active signal to the 4:1 decimator 300.

The 4:1 decimator 300 selects and outputs one-fourth of the IFFT data. That is, the 4:1 decimator 300 outputs 64 points data corresponding to the 64 points of input data. The 4:1 decimator 300 multiplies 256/64, i.e., four times of scaling values, in order to compensate for the IFFT output data of 64 points in the IFFT structure of 256 points. The reason why the 4:1 decimator 300 multiplies four times of scaling values is that while a 256 points-based IFFT is identical to a multiplication by 1/256, since desired IFFT points are 64, a multiplication by 1/64 is required. The 4:1 decimator 300 multiplies four times of scaling values in order to make the multiplication by 1/256 equal to the multiplication by 1/64.

The operation of the IFFT mode selector 140 when the operation mode control signals S1 and S0 are 01 will now be described. At this time, when the IFFT operation mode is the 128 point mode and the 2×4 decoder 360 outputs the operation active signal to the 2:1 decimator 320.

The 2:1 decimator 320 selects and outputs one half of the IFFT data. That is, the 2:1 decimator 320 outputs 128 points of data corresponding to the 128 points of input data. The 2:1 decimator 320 multiplies 256/128, i.e., two times of scaling values, in order to compensate for the IFFT output data of 128 points in the IFFT structure of 256 points.

The operation of the IFFT mode selector 140 when the operation mode control signals S1 and S0 are 10 will now be described. At this time, when the IFFT operation mode is the 256 point mode, and the 2×4 decoder 360 outputs the operation active signal to the 1:1 buffer 340.

The 1:1 buffer 340 outputs 256 points of the IFFT data as they are.

Figure 4:
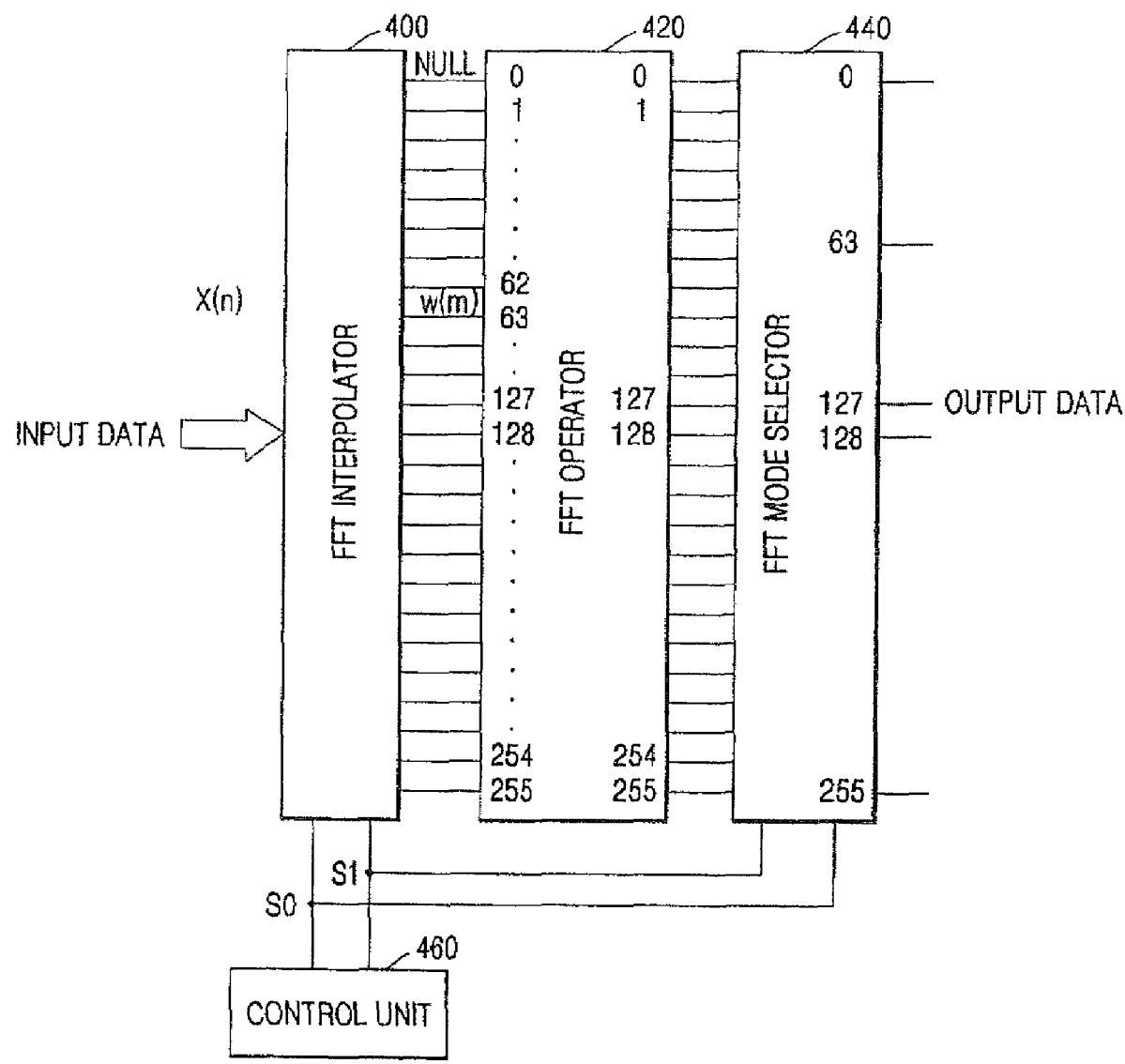
FIG. 4 is a block diagram of a variable point FFT apparatus capable of performing variable point FFT according to another embodiment of the present invention.
Figure 5:
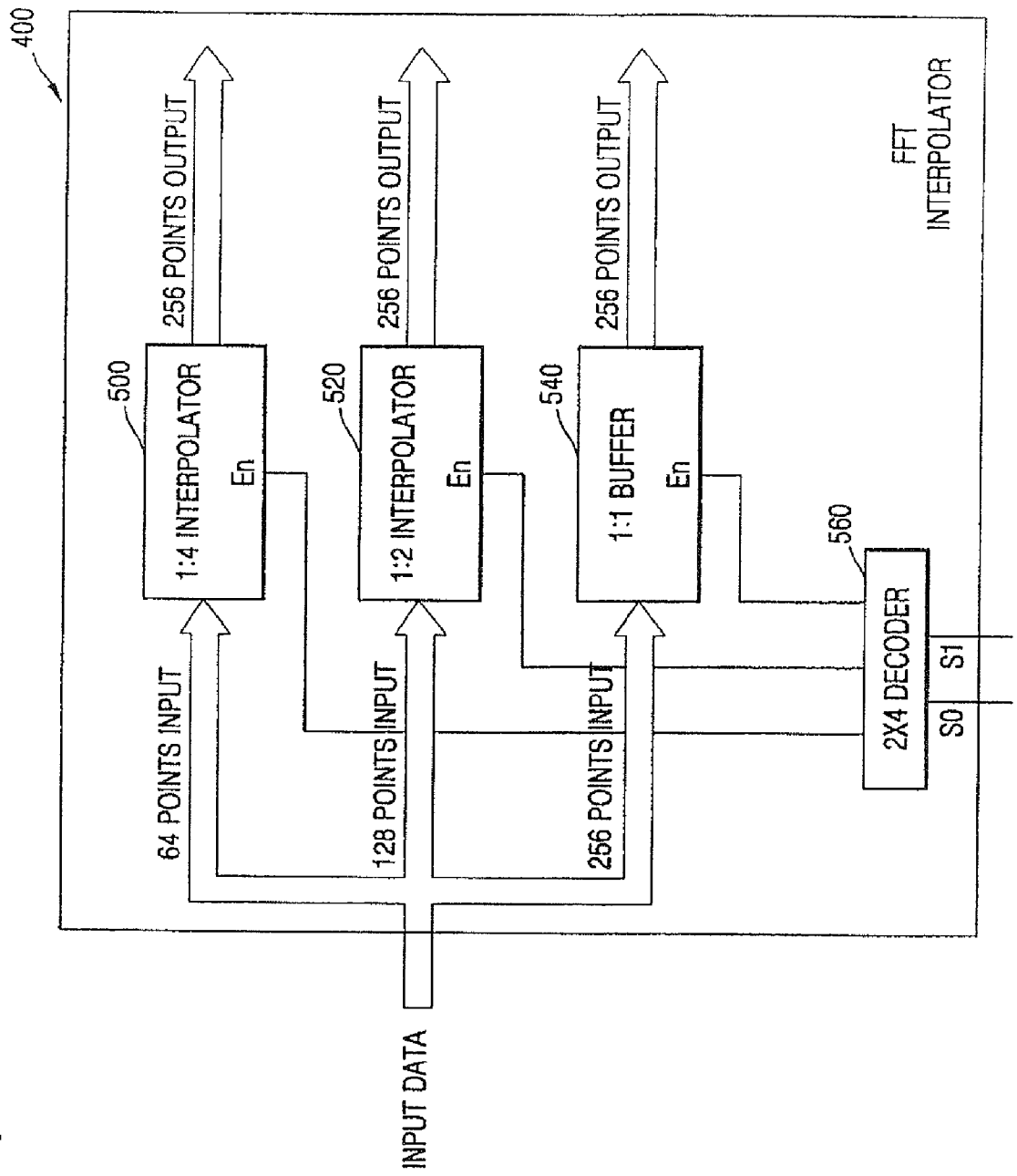
FIG. 5 is a block diagram of a FFT interpolator illustrated in FIG. 4.
Figure 6:
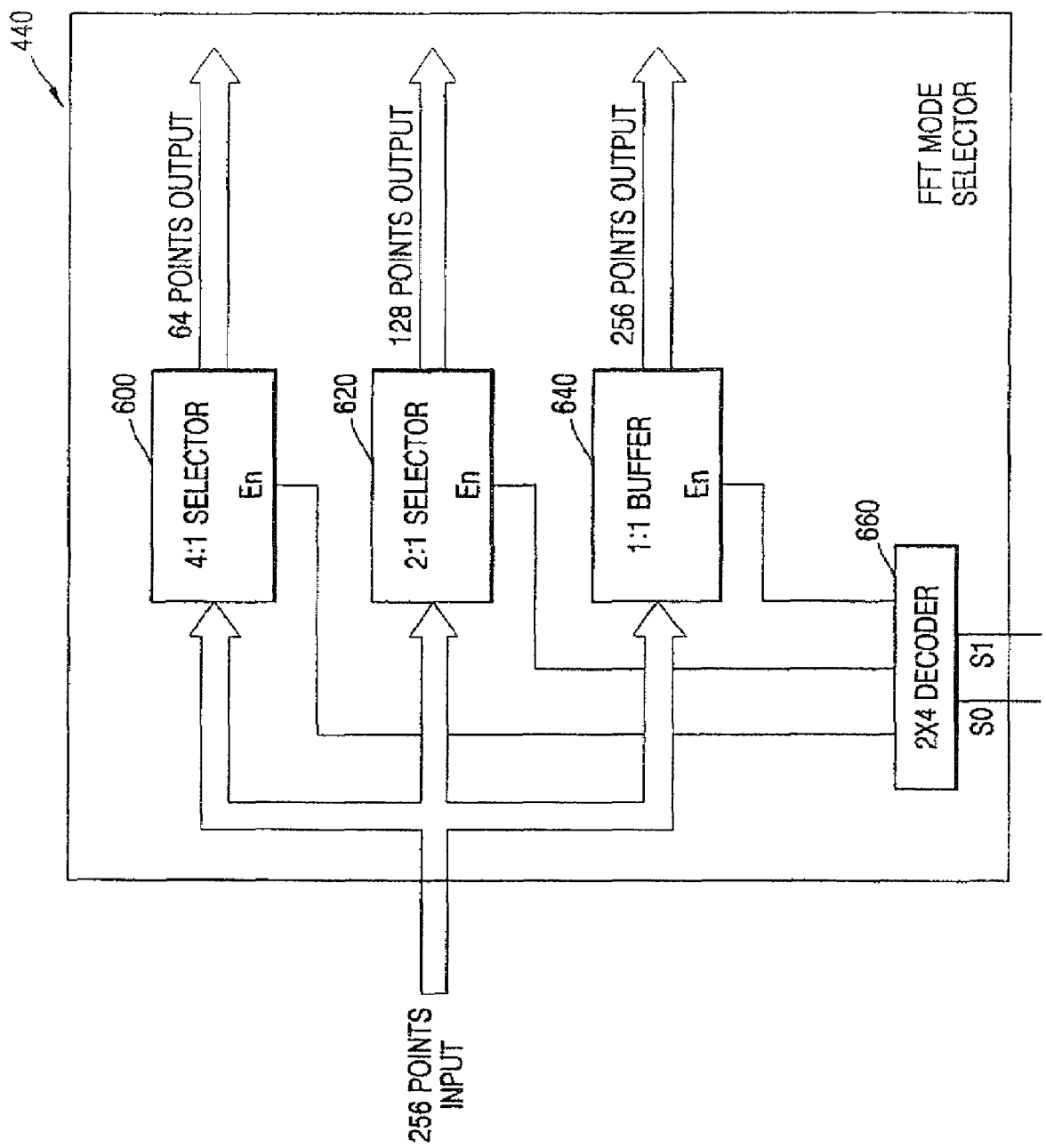
FIG. 6 is a block diagram of a FFT mode selector illustrated in FIG. 4.

FIG. 4 is a block diagram of variable point FFT apparatus capable of performing variable points FFT according to another embodiment of the present invention. FIG. 5 is a block diagram of a FFT interpolator 400 of FIG. 4. FIG. 6 is a block diagram of a FFT mode selector 440 of FIG. 4.

Referring to FIG. 4, the variable point FFT apparatus performs 64 points FFT, 128 points FFT, and 256 points FFT. To this end, the variable point FFT apparatus comprises a FFT interpolator 400, a FFT operator 420, and a FFT mode selector 440.

The FFT interpolator 400 and the FFT mode selector 440 receive operation mode control signals S1 and S0 and select a FFT operation mode.

The relationship between the operation modes of the variable point FFT and the operation mode control signals S1 and S0 is described in Table 1 above.

The FFT interpolator 400 interpolates interpolation data (preferably, 0) into the data input to the variable point FFT apparatus according to the FFT operation mode and outputs 256 points of data, The FFT interpolator 400 will now be described in detail with reference to FIG. 5.

The specific operation of the FFT interpolator 400 is described in Equation 1 below.

$$w(m) = X(n) \quad \ldots \quad \text{if } m = 4n \qquad 1)$$
$$= 0 \quad \ldots \quad \text{otherwise}$$

wherein, w (m) indicates the output of the FFT interpolator 400, and X(n) indicates the input of the FFT interpolator 400.

Referring to FIG. 5, a 2×4 decoder 560 receives the operation mode control signals S1 and S0 and generates an operation active signal based on the information as shown in Table 1 above. When operation mode control signals S1 and S0 are 00, i.e., when the FFT operation mode is a 64 point mode, the 2×4 decoder 560 outputs an operation active signal to a 1:4 interpolator 500.

When the operation mode control signals S1 and S0 are 01, i.e., when the FFT operation mode is a 128 point mode, the 2×4 decoder 560 outputs an operation active signal to a 1:2 interpolator 520.

When the operation mode control signals S1 and S0 are 10, i.e., when the FFT operation mode is a 256 point mode, the 2×4 decoder 560 outputs an operation active signal to a 1:1 buffer 540.

When the operation mode control signals S1 and S0 are 11, the FFT operation mode is a reserved mode.

The operation of the FFT interpolator 500 when the operation mode control signals S1 and S0 are 00, i.e., when the FFT operation mode is the 64 point mode, which means that the input data contains 64 points will now be described in detail. The 2×4 decoder 560 outputs the operation active signal to the 1:4 interpolator 500.

The 1:4 interpolator 500 receives input data containing 64 points, and inputs 0s three (3) points between each of the 64 points of input data, i.e., a total of 192 0s between input data, in order to maintain 256 points of output data of the FFT interpolator 400.

The operation when the operation mode control signals S1 and S0 are 01, i.e., when the FFT operation mode is the 128 points, which means that the input data contains 128 points will now be described in detail. The 2×4 decoder 560 outputs the operation active signal to the 1:2 interpolator 520.

The 1:2 interpolator 520 receives input data containing 128 points, and inputs 0s one (1) point between each of the 128 points of input data, i.e., a total of 128 0s between input data, in order to maintain 256 points of output data of the FFT interpolator 400.

The operation when the operation mode control signals S1 and S0 are 10, i.e., when the FFT operation mode is the 256 point mode, which means that the input data contains 256 points will now be described in detail. The 2×4 decoder 560 outputs the operation active signal to the 1:1 buffer 540.

The 1:1 buffer 540 receives input data containing 256 points and outputs them as they are in order to maintain 256 points of output data of the FFT interpolator 400.

The FFT operator 420 receives output data from the FFT interpolator 400 to perform the FFT. The FFT operation data obtained by the FFT operator 420 are input to the FFT mode selector 440, which will now be described in detail with reference to FIG. 6.

Referring to FIG. 6, the FFT mode selector 440 receives 256 points of the FFT operation data from the FFT operator 420.

A 2×4 decoder 660 receives operation mode control signals S1 and S0 and generates an operation active signal based on the information as shown in Table 1 above. When the operation mode control signals S1 and S0 are 00, i.e., when the FFT operation mode is the 64 point mode, the 2×4 decoder 660 outputs an operation active signal to a 4:1 selector 600.

When the operation mode control signals S1 and S0 are 01, i.e., when the FFT operation mode is the 128 point mode, the 2×4 decoder 660 outputs an operation active signal to a 2:1 selector 620.

When operation mode control signals S1 and S0 are 10, i.e., when the FFT operation mode is the 256 point mode, the 2×4 decoder 660 outputs an operation active signal to a 1:1 buffer 640.

When operation mode control signals S1 and S0 are 11, the FFT operation mode is a reserved mode.

The operation of the FFT mode selector 440 when the operation mode control signals S1 and S0 are 00, i.e., when the FFT operation mode is the 64 point mode, which means that the input data contains 64 points will now be described in detail. At this time, the 2×4 decoder 660 outputs the operation active signal to the 4:1 selector 600.

The 4:1 selector 600 selects and outputs the $0^{th}$ through the $63^{rd}$ points of the FFT operation data. The 4:1 selector 600 outputs 64 points of data to correspond to the original 64 points of input data.

The operation of the FFT mode selector 440 when the operation mode control signals S1 and S0 are 01 will now be described in detail. When the FFT operation mode is the 128 point mode, the 2×4 decoder 660 outputs the operation active signal to the 2:1 selector 620.

The 2:1 selector 620 selects and outputs the $0^{th}$ through $127^{th}$ points of FFT operation data. The 2:1 selector 620 outputs 128 points of data to correspond to the original 128 points of input data.

The operation of the FFT mode selector 440 when the operation mode control signals S1 and S0 are 10 will now be described in detail. When the FFT operation mode is the 256 point mode, the 2×4 decoder 660 outputs the operation active signal to the 1:1 buffer 640.

The 1:1 buffer 640 selects and outputs the $0^{th}$ through $256^{th}$ points of FFT operation data. The 1:1 buffer 640 outputs 256 points of data to correspond to the original 256 points of input data.

FIGS. 1 through 6 describe embodiments of the present invention in which 64, 124, and 256 points of input data are processed. However, the present invention is not limited to this. For example, 16, 32, 64, 128, 256, 512, 1024, and 2048 points may be processed in the present invention. The relationship between the IFFT/FFT operation mode control signals and the IFFT/FFT operation modes are described in Table 2.

TABLE 2

| operation mode control signals (S2, S1 and S0) | IFFT/FFT operation mode |
|---|---|
| 0 0 0 | 16 points |
| 0 0 1 | 32 points |
| 0 1 0 | 64 points |
| 0 1 1 | 128 points |
| 1 0 0 | 256 points |
| 1 0 1 | 512 points |
| 1 1 0 | 1024 points |
| 1 1 1 | 2048 points |

In FIGS. 1 through 6, the variable point IFFT/FFT apparatus are realized by interpolating 0s into input data, performing the IFFT/FFT operation, and selecting an operation mode according to operation mode signals.

A variable point IFFT/FFT apparatus according to another embodiment of the present invention will be now described.

Figure 7:
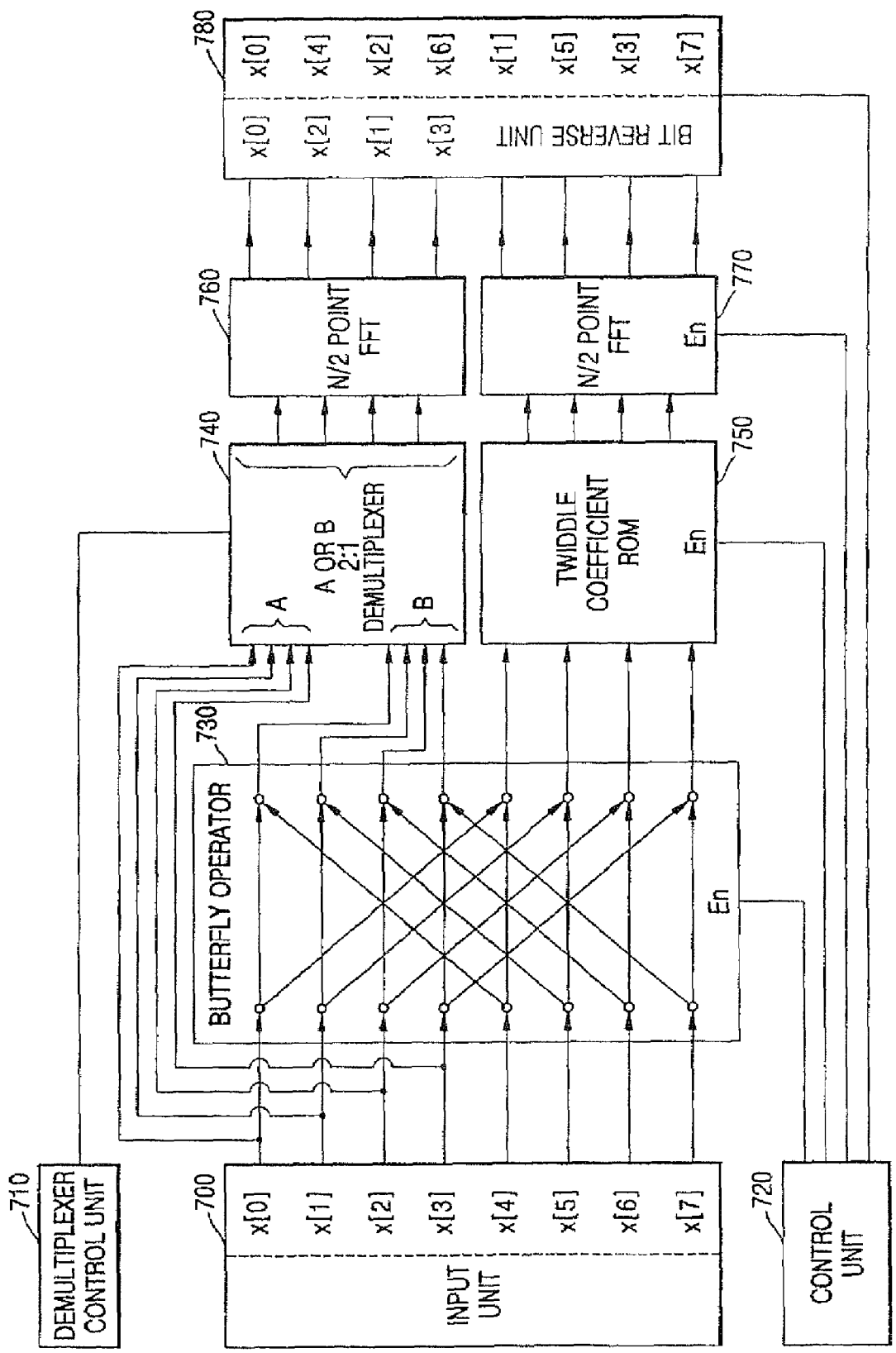
FIG. 7 is a block diagram of 8-4 points variable FFT apparatus according to an embodiment of the present invention.

FIG. 7 is a block diagram of 8-4 points variable FFT apparatus according to another embodiment of the present invention. Referring to FIG. 7, the FFT apparatus receives input data corresponding to desired points from an input unit 700. For example, the FFT apparatus receives 8 points of input data if an 8-point FFT is desired, and the FFT apparatus receives 4 points of input data if a 4-point FFT is desired. With reference to FIG. 7, the case where the FFT apparatus that receives 8 points of input data will now be described.

A butterfly operator 730 receives 8 points of input data from the input unit 700. The butterfly operator 730 separates the 8 points of input data in half, performing a butterfly operation on the input data, and outputs the result to a twiddle coefficient ROM 750. The twiddle coefficient ROM 750 multiplies the butterfly operation result by a stored twiddle coefficient. Such process results in an N/2 point FFT 770. The N/2 point FFT 770 separates the butterfly operation from the stored twiddle coefficient in the same manner. That is, the N/2 point FFT 770 is changed to an N/4 point FFT, and the N/4 point FFT is changed to an N/8 point FFT. The butterfly operation is separated from the stored twiddle coefficient is repeated until a 2-point FFT is obtained. An output sequence is changed according to the characteristics of an FFT algorithm. A bit reverse unit 780 is required to compensate for a change in the output sequence.

A control unit 720 controls activation of the butterfly operator 730 and the twiddle coefficient ROM 750. A demultiplexer control unit 710 controls a demultiplexer 740 to output signals B used to demultiplex output signals B of the butterfly operator 730 to an N/2 point FFT 760. The N/2 point FFT 760 separates the butterfly operation from the twiddle coefficient in the same manner as described above.

If the FFT apparatus receives 4 points of input data, the N/2 point FFT 760 receives 4 points of input data A directly from the input unit 700 not from a unit for separating the butterfly operator 730 from the twiddle coefficient ROM 750. At this time, since bit reversing occurs, the 4-point FFT is performed using a 4-bit bit reversing apparatus. The control unit 720 deactivates the butterfly operator 730 and the twiddle coefficient ROM 750. The demultiplexer control unit 710 controls the demultiplexer 740 to select four input signals A from four input signals A and four output signals B of the butterfly operator 730.

Accordingly, when an FFT is to be performed on 64 points, 128 points, 256 points, 1024 points, and 2048 points, the FFT having the largest point is configured as apparatus, and an N/2 FFT point corresponding to a desired FFT is searched. To be more specific, a 1024-point FFT is changed to a 512-point FFT, and the 512-point FFT is changed to a 256-point FFT after performing the butterfly operation. Hence, a continuous search of the N/2 FFT point and data input in the desired point result in the variable point FFT described in FIGS. 4 through 6.

While the FFT apparatus is described in FIG. 7, since an IFFT apparatus and the FFT apparatus are identical, except that they have different factors in an exponent term, structures of an IFFT apparatus is identical to the structures of the FFT apparatus shown in FIG. 7, except that the coefficient of the exponent term is different in the twiddle factor ROM 750 in the IFFT apparatus.

Figure 8:
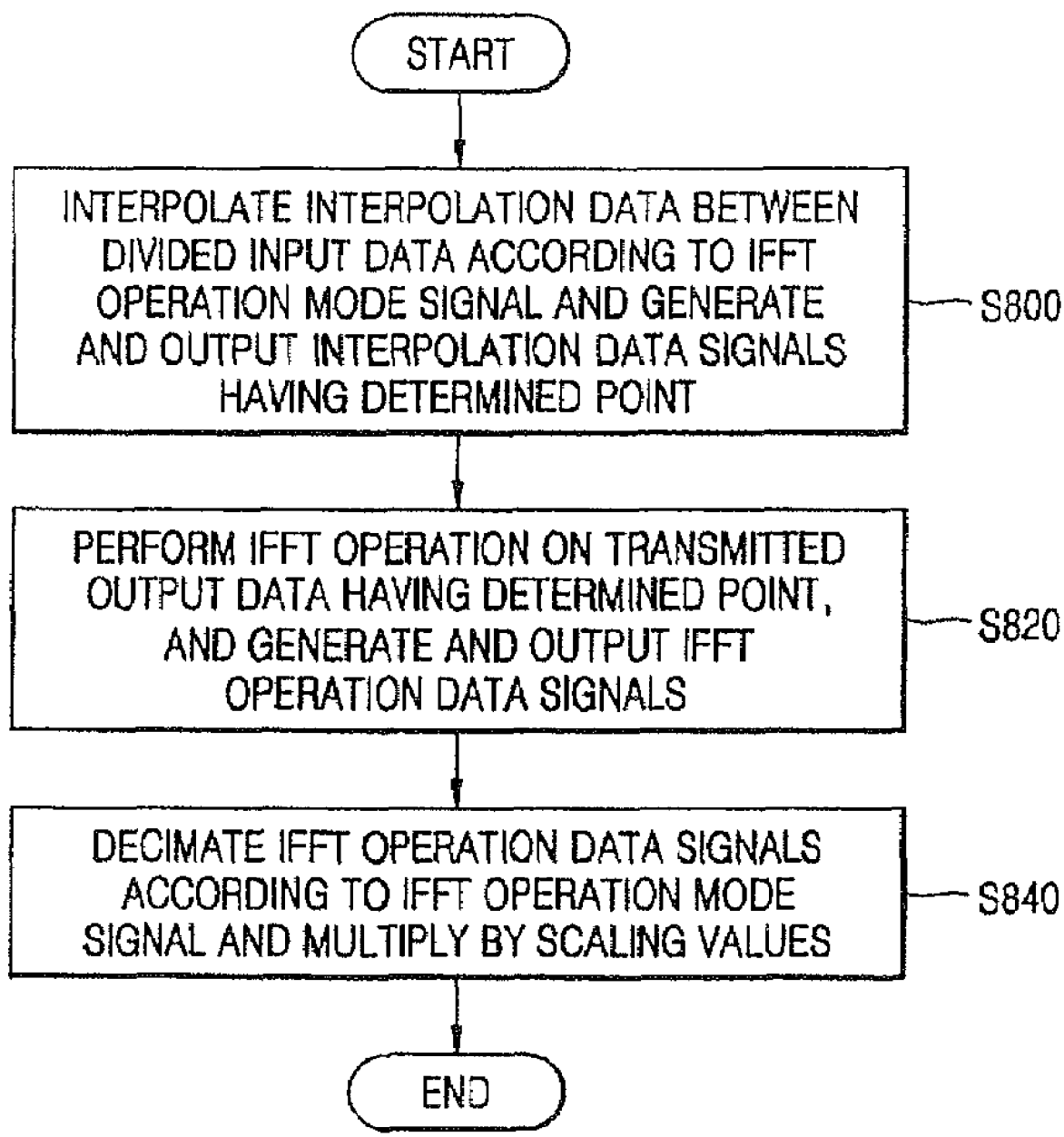
FIG. 8 is a flowchart illustrating a method of performing a variable point IFFT according to an embodiment of the present invention.

FIG. 8 is a flowchart of a method of performing variable point IFFT according to an embodiment of the present invention. Referring to FIG. 8, input data are divided in half, and a plurality of interpolation data (preferably, 0s), the number of which depends on an IFFT operation mode signal, are interpolated between the divided input data, thereby generating interpolation data signals having a point determined in an IFFT apparatus (Operation 800).

An IFFT operation is performed on the interpolation data signals, thereby generating IFFT data signals (Operation 820).

Some of the IFFT data signals are selected and output according to the IFFT operation mode signal in order to have the same number of points as the input data (Operation 840).

A more detailed description of the method illustrated in FIG. 8 can be inferred from the description above regarding FIGS. 1 through 3.

FIG. 9 is a flowchart of a method of performing variable point FFT according to another embodiment of the present invention. Referring to FIG. 9, interpolation data (preferably, 0s), the number of which depends on FFT operation mode signal, are interpolated between input data which are divided in half, thereby generating interpolation data signals having a point determined in an FFT apparatus (Operation 900).

An FFT operation is performed on the interpolation data signals, thereby generating FFT data signals (Operation 920).

Some of the FFT data signals are selected and output according to the FFT operation mode signal in order to have the same number of points as the input data (Operation 940).

A more detailed description of the method illustrated in FIG. 9 can be inferred from the description above regarding FIGS. 4 through 6.

It is possible for the present invention to be realized on a computer-readable recording medium as a computer-readable code. Computer-readable recording mediums include every kind of recording device that stores computer system-readable data. ROMs, RAMs, CD-ROMs, magnetic tapes, floppy discs, optical data storage, etc. are used as a computer-readable recording medium. Computer-readable recording mediums can also be realized in the form of a carrier wave (e.g., transmission through Internet). A computer-readable recording medium is dispersed in a network-connecting computer system, resulting in being stored and executed as a computer-readable code by a dispersion method.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the present invention is defined not by the detailed description of the invention but by the appended claims, and all differences within the scope of the present invention will be construed as being included in the present invention.

The invention claimed is:

1. An apparatus for performing a variable point Inverse Fast Fourier Transform (IFFT), comprising:

an IFFT interpolator to receive input data having N1 points and output interpolated data signals having N2 points, the IFFT interpolator including a plurality of interpolators, one of which is activated to output the interpolated data signals having N2 points based on the input data having N1 points, the one interpolator activated being selected according to a first IFFT operation mode signal, wherein N1 is a number that is no greater than N2;

an IFFT operator to generate IFFT operation data signals having N2 points by performing an IFFT operation on the interpolated data signals having N2 points;

an IFFT mode selector to receive the IFFT operation data signals having N2 points and output IFFT data signals having N1 points, the IFFT mode selector including a plurality of decimators, one of which is activated to output the IFFT data signals having N1 points, the one decimator activated being selected according to a second IFFT operation mode signal that corresponds to the first IFFT operation mode signal provided to the IFFT interpolator; and a control unit to output the first IFFT operation mode signal and the second IFFT operation mode signal.

2. The apparatus of claim 1, wherein the first and second IFFT operation mode signals are the same, wherein the IFFT interpolator includes a first buffer and the IFFT mode selector includes a second buffer, wherein if N1 is equal to N2, the first buffer of the IFFT interpolator is activated to output the interpolated data signal and the second buffer of the IFFT mode selector is activated to output the IFFT data signals.

3. The apparatus of claim 1, wherein the IFFT interpolator includes first, second, and third interpolators and the IFFT mode selector includes first, second, and third decimators, and wherein the first interpolator and the first decimator are activated if N1 points corresponds to a first predetermined number, and the second interpolator and the second decimator are activated if N1 points corresponds to a second predetermined number, and the third interpolator and the third decimator are activated if N1 points corresponds to a third predetermined number.

4. The apparatus of claim 1, wherein the one decimator activated multiply the IFFT operation data having N2 points by a scaling values equal to a decimation ratio.

5. The apparatus of any one of claims 1 through 4, wherein the interpolation data are 0s.

6. An apparatus for performing a variable point Fast Fourier Transform (FFT), comprising:

an FFT interpolator to receive input data having N1 points and output interpolated data signals having N2 points, the FFT interpolator including a plurality of interpolators, one of which is activated to output the interpolated data signals having N2 points based on the input data having N1 points, the one interpolator activated being selected according to a first FFT operation mode signal, wherein Ni is a number that is no greater than N2;

an FFT operator to generate FFT operation data signals having N2 points by performing an FFT operation on the interpolated data signals having N2 points;

an FFT mode selector to receive the FFT operation data signals having N2 points and output FFT data signals having N1 points, the FFT mode selector including a plurality of decimators, one of which is activated to output the FFT data signals having N1 points, the one decimator activated being selected according to a second FFT operation mode signal that corresponds to the first FFT operation mode signal provided to the FFT interpolator; and a control unit to output the first FFT operation mode signal and the second FFT operation mode signal.

7. The apparatus of claim 6, the first and second FFT operation mode signals are the same, wherein the FFT interpolator includes a first buffer and the FFT mode selector includes a second buffer, wherein if N1 is equal to N2, the first buffer of the FFT interpolator is activated to output the interpolated data signal and the second buffer of the FFT mode selector is activated to output the FFT data signals.

8. The apparatus of claim 6, wherein the FFT interpolator includes first, second, and third interpolators and the FFT mode selector includes first, second, and third decimators, and wherein the first interpolator and the first decimator are activated if N1 points corresponds to a first predetermined number, and the second interpolator and the second decimator are activated if N1 points corresponds to a second predetermined number, and the third interpolator and the third decimator are activated if N1 points corresponds to a third predetermined number.

9. The apparatus of any one of claims 6 through 8, wherein the interpolation data are 0s.

10. An apparatus for performing a variable point IFFT/FFT, comprising:

a butterfly operator receiving N pieces of input data and performing a butterfly operation on the input data;

a demultiplexer outputting an input data signal equal to ½ point in N pieces of input data or a signal output by the butterfly operator;

a first N/2 IFFT/FFT performing an IFFT/FFT operation on N/2 pieces of data received from the demultiplexer;

a twiddle coefficient ROM multiplying the output of the butterfly operator by a twiddle coefficient;

a second N/2 IFFT/FFT performing an IFFT/FFT operation on N/2 pieces of data received from the twiddle coefficient ROM;

a bit reverse unit performing a bit reversing operation or output signals from the first N/2 IFFT/FFT and the second N/2 IFFT/FFT; and a control unit controlling operations of the butterfly operator, the twiddle coefficient ROM, and second N/2 IFFT/FFT.

11. The apparatus of claim 10, further comprising:

a demultiplexer control unit controlling the demultiplexer to output the input datasignal equal to ½ point in N pieces of input data or the signal output by the butterfly operator.

12. The apparatus of claim 11, wherein the first N/2 point IFFT/FFT apparatus can operate on N pieces of input data, the control unit deactivates the butterfly operator and the twiddle coefficient ROM, and the demultiplexer control unit selects input data signals corresponding to ½ of the N pieces of input data.

13. The apparatus of claim 11, wherein the variable point IFFT apparatus or the variable point FFT apparatus is determined according to a twiddle coefficient structure of the twiddle coefficient ROM.

14. A method of performing a variable point IFFT, comprising:

receiving input data having Ni points at an IFFT interpolator;

activating one of a plurality of interpolators associated with the IFFT interpolator to output interpolated data signals having N2 points, the one interpolator activated being selected according to a first IFFT operation mode signal, wherein N1 is a number that is no greater than N2;

performing an IFFT operation on the interpolated data signals having N2 points to generate IFFT operation data signals having N2 points;

receiving the IFFT operation data signals having N2 points at an IFFT mode selector and activating one of a plurality of decimators associated with the IFFT mode selector to output IFFT data signals having N1 points, the one decimator activated being selected according to a second IFFT operation mode signal that corresponds to the first IFFT operation mode signal provided to the IFFT interpolator.

15. A method of performing a variable point FFT, comprising:

receiving input data having N1 points at an FFT interpolator;

activating one of a plurality of interpolators associated with the FFT interpolator to output interpolated data signals having N2 points, the one interpolator activated being selected according to a first FFT operation mode signal, wherein N1 is a number that is no greater than N2;

performing an FFT operation on the interpolated data signals having N2 points to generate IFFT operation data signals having N2 points;

receiving the FFT operation data signals having N2 points at an FFT mode selector; and activating one of a plurality of decimators associated with the FFT mode selector to output FFT data signals having N1 points, the one decimator activated being selected according to a second FFT operation mode signal that corresponds to the first FFT operation mode signal provided to the FFT interpolator.

* * * * *